United States Patent
Guen

(10) Patent No.: US 8,524,390 B2
(45) Date of Patent: Sep. 3, 2013

(54) SECONDARY BATTERY

(75) Inventor: Minhyung Guen, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 118 days.

(21) Appl. No.: 13/067,957

(22) Filed: Jul. 11, 2011

(65) Prior Publication Data

US 2012/0094171 A1 Apr. 19, 2012

(30) Foreign Application Priority Data

Oct. 18, 2010 (KR) .................. 10-2010-0101455

(51) Int. Cl.
*H01M 2/02* (2006.01)

(52) U.S. Cl.
USPC ........... 429/170; 429/121; 429/123; 429/178; 429/179; 429/181; 429/182

(58) Field of Classification Search
USPC .................. 429/121–123, 170, 178, 179, 181
See application file for complete search history.

(56) References Cited

U.S. PATENT DOCUMENTS

| | | | |
|---|---|---|---|
| 2008/0042500 A1* | 2/2008 | Horng et al. | 310/51 |
| 2009/0186269 A1* | 7/2009 | Kim et al. | 429/179 |
| 2009/0269620 A1* | 10/2009 | Kim | 429/7 |

FOREIGN PATENT DOCUMENTS

| | | |
|---|---|---|
| JP | 08-329926 A | 12/1996 |
| JP | 10-064576 A | 3/1998 |
| JP | 2004-349080 A | 12/2004 |
| JP | 2010-097822 A | 4/2010 |
| KR | 10 2006-0112729 A | 11/2006 |
| KR | 10-0717754 B1 | 5/2007 |
| KR | 10 2008-00998 A | 11/2008 |

OTHER PUBLICATIONS

Korean Notice of Allowance in KR 10-2010-0101455, dated Jul. 31, 2012.
Korean Office Action in KR 10-2010-0101455, dated Dec. 30, 2011 (GUEN).

* cited by examiner

*Primary Examiner* — Patrick Ryan
*Assistant Examiner* — Ben Lewis
(74) *Attorney, Agent, or Firm* — Lee & Morse, P.C.

(57) ABSTRACT

A secondary battery including an electrode assembly; a case housing the electrode assembly; a current collecting terminal electrically connected to the electrode assembly; a cap plate capping the case to seal the electrode assembly, the case, and the current collecting terminal; an insulation member interposed between the current collecting terminal and the cap plate; an electrode terminal electrically connected to the current collecting terminal and extending through the insulation member and the cap plate; and shock damping members between the electrode assembly and the cap plate, the shock damping members being coupled with the insulation member.

14 Claims, 8 Drawing Sheets

SECONDARY BATTERY

BACKGROUND

1. Field

Embodiments relate to a secondary battery.

2. Description of the Related Art

Unlike a primary battery, secondary batteries are capable of repeatedly charging and discharging. Lower power batteries (having a single battery cell packaged in a pack) may be used for various small-sized portable electronic devices, e.g., cellular phones and camcorders. Bulk size batteries (having several tens of battery cells connected to each other) may be used as a power source for a motor drive, e.g., in electric scooters, hybrid electric vehicles, or electric vehicles.

In general, secondary batteries may be classified into different types, e.g., prismatic, cylindrical, or the like. A secondary battery may include an electrode assembly (including a positive electrode plate, a negative electrode plate, and an insulating separator interposed between the positive and negative electrode plates), a case housing the electrode assembly together with an electrolyte, and a cap plate installed on the case. Positive and negative electrode terminals may be connected to the electrode assembly and may then be exposed or may protrude outside through the cap plate.

SUMMARY

Embodiments are directed to a secondary battery.

The embodiments may be realized by providing a secondary battery including an electrode assembly; a case housing the electrode assembly; a current collecting terminal electrically connected to the electrode assembly; a cap plate capping the case to seal the electrode assembly, the case, and the current collecting terminal; an insulation member interposed between the current collecting terminal and the cap plate; an electrode terminal electrically connected to the current collecting terminal and extending through the insulation member and the cap plate; and shock damping members between the electrode assembly and the cap plate, the shock damping members being coupled with the insulation member.

The insulation member may include throughholes therethrough, the shock damping members extending through the throughholes.

The insulation member may further include lower mounting grooves on a bottom surface thereof, the throughholes being connected with the lower mounting grooves and the lower mounting grooves being coupled with the shock damping members.

Each of the shock damping members may include a body closely contacting a bottom surface of the insulation member, and a coupling protrusion extending upwardly through the insulation member.

The coupling protrusion may include a hooking protrusion on a top end thereof.

The insulation member may further include an upper mounting groove on a top surface thereof, the hooking protrusion being seated on the upper mounting groove.

The hooking protrusion may be in close contact with the cap plate.

Each of the shock damping members may have a plurality of protrusions on a surface of the body, and at least one of the plurality of protrusions may closely contact a bottom surface of the insulation member.

The plurality of protrusions may include protrusions each of different heights from one another.

The plurality of protrusions may be connected to one another.

The body of each of the shock damping members may have a width greater than a width of the coupling protrusion.

Each of the shock damping members may have a R-scale Rockwell hardness smaller than a R-scale Rockwell hardness of the insulation member.

Each of the shock damping members may be made of rubber.

Each of the shock damping members may be made of polyurethane rubber.

The shock damping members may have a R-scale Rockwell hardness of about 40 to about 50.

BRIEF DESCRIPTION OF THE DRAWINGS

The embodiments will become more apparent to those of ordinary skill in the art by describing in detail exemplary embodiments with reference to the attached drawings, in which.

DETAILED DESCRIPTION

Figure 1:
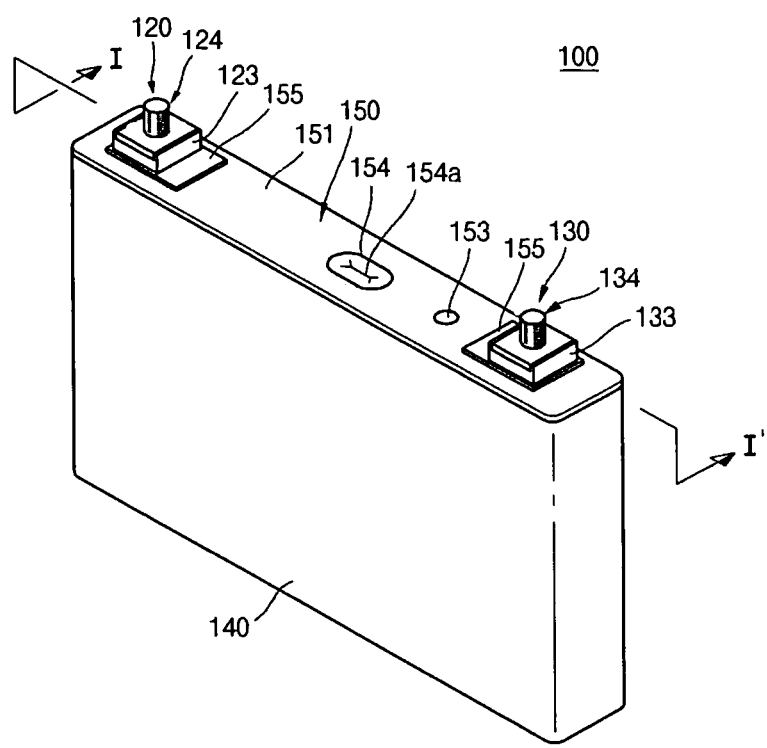
FIG. 1 illustrates a perspective view of a secondary battery according to an embodiment.

Korean Patent Application No. 10-2010-0101455 filed on Oct. 18, 2010, in the Korean Intellectual Property Office, and entitled: "Secondary Battery," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout.

In addition, it will be understood that when a layer or element is referred to as being "electrically connected to" another layer or element, it can be directly on the other layer or element, or intervening elements may also be present.

Figure 2:
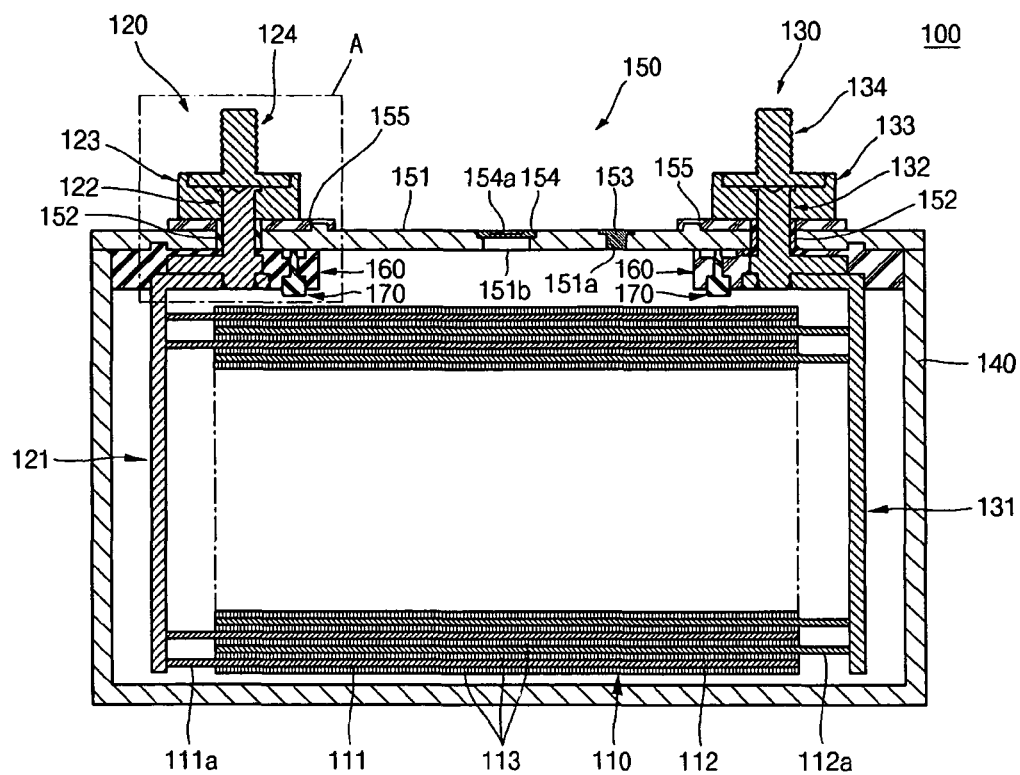
FIG. 2 illustrates a cross sectional view of the secondary battery, taken along the line I-I' of FIG. 1.
Figure 3:
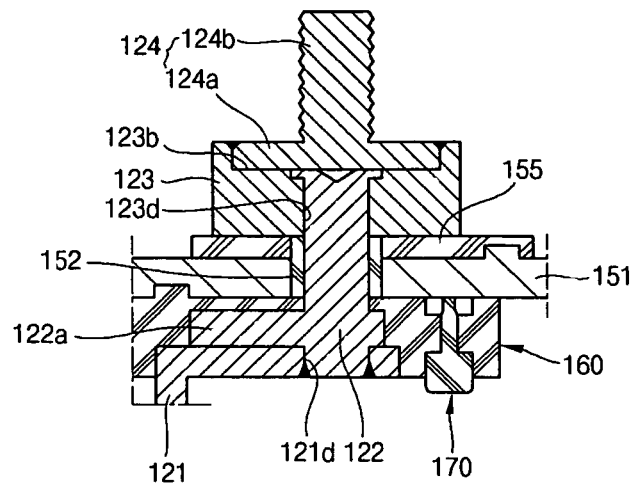
FIG. 3 illustrates an enlarged cross sectional view of a portion "A" shown in FIG. 2.
Figure 4:
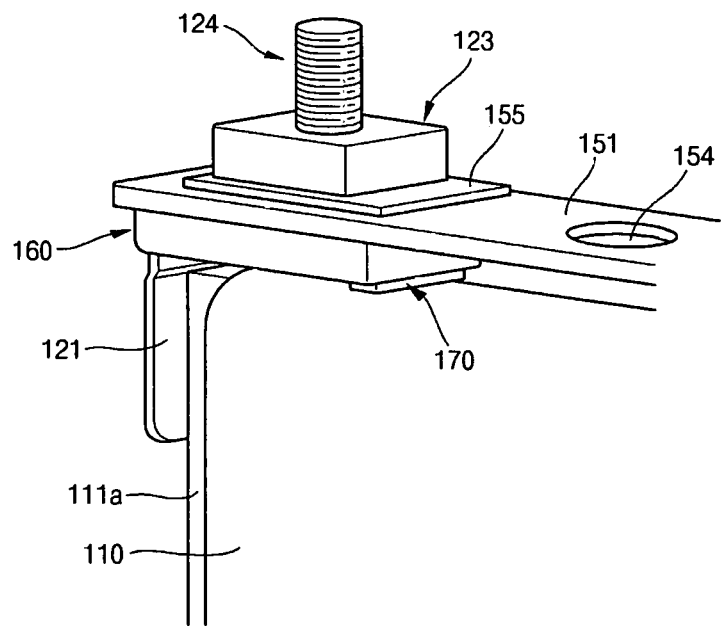
FIG. 4 illustrates an enlarged perspective view showing a lower insulation member interposed between an electrode assembly and a cap plate in the secondary battery of FIG. 1.

FIG. 1 illustrates a perspective view of a secondary battery according to an embodiment. FIG. 2 illustrates a cross sectional view of the secondary battery, taken along the line I-I' of FIG. 1. FIG. 3 illustrates an enlarged cross sectional view of a portion "A" shown in FIG. 2. FIG. 4 illustrates an enlarged perspective view showing a lower insulation member interposed between an electrode assembly and a cap plate of the secondary battery of FIG. 1.

As shown in FIGS. 1 through 4, the secondary battery 100 according to an embodiment may include an electrode assembly 110, a first terminal 120, a second terminal 130, a case 140, and a cap assembly 150.

The electrode assembly 110 may be fabricated by winding or laminating a stacked structure including a first electrode plate 111, a separator 113, and a second electrode plate 112 (each of which is in the form of a thin plate or layer). In an implementation, the first electrode plate 111 may serve as a negative electrode and the second electrode plate 112 may serve as a positive electrode, and vice versa.

The first electrode plate 111 may be formed by coating a first electrode active material, e.g., graphite or a carbon material, on a first electrode collector made of a metal foil, e.g., copper or nickel. The first electrode plate 111 may include a first electrode uncoated portion 111a having no first electrode active material coated thereon. The first electrode uncoated portion 111a may be a passageway of the flow of current between the first electrode plate 111 and an outside of the first electrode plate 111. However, the embodiments are not limited thereto.

The first electrode plate 111 and the second electrode plate 112 may have different polarities.

The separator 113 may be positioned between the first electrode plate 111 and the second electrode plate 112 to prevent an electrical short and to facilitate movement of lithium ions therebetween. In an implementation, the separator may be made of, e.g., polyethylene, polypropylene, or a composite film of polyethylene and polypropylene. However, the embodiments are not limited thereto.

The second electrode plate 112 may be formed by coating a second electrode active material, e.g., a transition metal oxide, on a second electrode collector made of a metal foil, e.g., aluminum. The second electrode plate 112 may include a second electrode uncoated portion 112a having no second electrode active material coated thereon. The second electrode uncoated portion 112a may be a passageway of the flow of current between the second electrode plate 112 and an outside of the second electrode plate 112. However, the embodiments are not limited thereto.

A first terminal 120 and a second terminal 130 may be connected to ends of the electrode assembly 110, e.g., electrically connected to the first electrode plate 111 and the second electrode plate 112, respectively.

The electrode assembly 110 may be housed in the case 140 with an electrolytic solution. The electrolytic solution may include an organic solvent, e.g., EC (ethylene carbonate), PC (propylene carbonate), DEC (diethyl carbonate), EMC (ethyl methyl carbonate), or DMC (dimethyl carbonate), and a lithium salt, e.g., $LiPF_6$ or $LiBF_4$. In an implementation, the electrolytic solution may be in a liquid, solid or a gel phase.

The first terminal 120 may be formed of a metal or equivalents thereof and may be electrically connected to the first electrode plate 111. The first terminal 120 may include a first collector plate 121, a first current collecting terminal 122, a first terminal plate 123, and a first fastening terminal 124.

The first collector plate 121 may contact the first electrode uncoated portion 111a protruding at one end of the electrode assembly 110. In an implementation, the first collector plate 121 may be welded to the first electrode uncoated portion 111a. The first collector plate 121 may have a substantially 'inverted L' (Γ) shape; and a terminal hole 121d may be formed on a top surface thereof. The first current collecting terminal 122 may be inserted into the terminal hole 121d to then be coupled therewith. The first collector plate 121 may be made of, e.g., copper or a copper alloy. However, the embodiments are not limited thereto.

The first current collecting terminal 122 may extend through a cap plate 151 of the cap assembly 150 (to be described below) and may protrude upwardly therefrom to extend a predetermined length. The first current collecting terminal 122 may be electrically connected to the first collector plate 121 under the cap plate 151. A flange 122a (extending laterally from the first current collecting terminal 122) may be formed under the cap plate 151. For example, the flange 122a may prevent the first current collecting terminal 122 from being dislodged from the cap plate 151. A portion of first current collecting terminal 122 on the flange 122a may be fixed on a terminal hole 121d of the first collector plate 121 to then be welded thereto. For example, a top end of the first current collecting terminal 122 may be coupled to a first terminal plate 123 (to be described below) and may be riveted thereto. In an implementation, the first current collecting terminal 122 may be electrically insulated from the cap plate 151. The first current collecting terminal 122 may be made of, e.g., copper, a copper alloy, or equivalents thereof. However, the embodiments are not limited thereto.

The first terminal plate 123 may have a substantially rectangular parallelepiped shape and may include a throughhole 123d formed at a center thereof in a substantially vertical direction. The throughhole 123d may facilitate extension of the first current collecting terminal 122 therethrough and may facilitate coupling thereto. In addition, a fastening groove 123b (having a predetermined depth) may be formed roughly on a top surface of the first terminal plate 123 to facilitate placement of the first fastening terminal 124 therein. The first terminal plate 123 may be made of, e.g., stainless steel, copper, a copper alloy, aluminum, an alloy, and equivalents thereof, but is not limited thereto. In an implementation, the first terminal plate 123 and the cap plate 151 may be electrically insulated from each other.

The first current collecting terminal 122 and the first terminal plate 123 may be coupled to each other and fixed. For example, the first current collecting terminal 122 may extend through the throughhole 123d of the first terminal plate 123; and a top end of the first current collecting terminal 122 may be riveted to the first terminal plate 123. Thus, the first current collecting terminal 122 and the first terminal plate 123 may be mechanically and electrically coupled to each other. In an implementation, a top end of the first current collecting terminal 122 may be positioned at a same height with or lower than a top end of the fastening groove 123b of the first terminal plate 123. Accordingly, fastening or coupling of the first terminal plate 123 and the first fastening terminal 124 may not be hampered by the first current collecting terminal 122.

The first fastening terminal 124 may include a fastening body 124a and a bolt portion 124b. The fastening body 124a may be coupled to the fastening groove 123b of the first terminal plate 123. The fastening body 124a may be substantially board- or plate-shaped. Accordingly, the fastening body 124a may be closely coupled to the first current collecting terminal 122 and the first terminal plate 123 both mechanically and electrically. The bolt portion 124b may protrude upwardly by a predetermined length from the fastening body 124a. The bolt portion 124b may have a plurality of threads formed on a surface thereof. The first fastening terminal 124 may be made of, e.g., stainless steel, copper, a copper alloy, aluminum, an alloy, and equivalents thereof, but the embodiments are not limited thereto.

The first terminal plate 123 and the first fastening terminal 124 may be welded to each other at a boundary surface therebetween using, e.g., a laser beam. Accordingly, the first terminal plate 123 and the first fastening terminal 124 may be coupled and fixed to each other.

The second terminal 130 may also be made of a metal or equivalents thereof and may be electrically connected to the second electrode plate 112. The second terminal 130 may include a second collector plate 131, a second current collecting terminal 132, a second terminal plate 133, and a second fastening terminal 134. The second terminal 130 may have the same shape with the first terminal 120, and a repeated description of the shape of second terminal 130 will be omitted. However, the second collector plate 131 and the second current collecting terminal 132 may be made of, e.g., aluminum, an aluminum alloy, and equivalents thereof, but the embodiments are not limited thereto. In an implementation, the second terminal plate 133 and the second fastening terminal 134 may be made of, e.g., stainless steel, copper, a copper alloy, aluminum, an alloy, and equivalents thereof, but the embodiments are not limited thereto.

The second terminal plate 133 may be electrically connected to the cap plate 151. Accordingly, the case 140 and the cap plate 151, which will be described in greater detail below, may have the same polarity (e.g., a positive polarity) as the second terminal 130.

The case 140 may be made of a conductive metal, e.g., aluminum, an aluminum alloy, or nickel-plated steel. The case 140 may have a substantially rectangular parallelepiped shape with an opening to allow the electrode assembly 110, the first terminal 120, and the second terminal 130 to be inserted thereto and placed therein. FIG. 2 shows the case 140 and the cap assembly 150 coupled to each other. Thus, although the opening is not shown in FIG. 2, the opening corresponds to a top peripheral portion of the cap assembly 150, which is substantially opened. In an implementation, an internal surface of the case 140 may be insulated. Thus, the case 140 may be insulated from the electrode assembly 110, the first terminal 120, the second terminal 130, and the cap assembly 150.

The cap assembly 150 may be coupled to the case 140. The cap assembly 150 may include the cap plate 151, a seal gasket 152, a plug 153, a safety vent 154, and an upper insulation member 155. The cap assembly 150 may further include a lower insulation member 160.

The seal gasket 152, the upper insulation member 155, and the lower insulation member 160 may not be categorized as components of the cap assembly 150 but rather as components of the first terminal 120 and/or the second terminal 130. Alternatively, the seal gasket 152, the upper insulation member 155, and the lower insulation member 160 may be categorized as independent components.

The cap plate 151 may hermetically seal the opening of the case 140 and may be made of the same material as the case 140. The cap plate 151 may be coupled to the case 140 by, e.g., laser welding. As described above, the cap plate 151 may have the same polarity as the second terminal 130; and the cap plate 151 and the case 140 may also have the same polarity as each other.

The seal gasket 152 may be formed between each of the first current collecting terminal 122 and the second current collecting terminal 132 and the cap plate 151 using an insulating material, thereby hermetically sealing portions between each of the first current collecting terminal 122 and the second current collecting terminal 132 and the cap plate 151.

The seal gasket 152 may prevent external moisture from infiltrating into the secondary battery 100 and/or an electrolytic solution accommodated within the secondary battery 100 from flowing or leaking out. In an implementation, the seal gasket 152 may be made of, e.g., PFA (perfluoroalkoxy) that does not react with the electrolytic solution, but the embodiments are not limited thereto.

A plug 153 may seal an electrolytic solution injection hole 151a of the cap plate 151. A safety vent 154 may be installed at a vent hole 151b of the cap plate 151 and may include notch 154a configured to open at a predetermined pressure.

The upper insulation member 155 may be between each of the first terminal plate 123 and the second terminal plate 133 and the cap plate 151. The upper insulation member 155 may be closely coupled to the cap plate 151. Further, the upper insulation member 155 may also be closely coupled to the seal gasket 152. The upper insulation member 155 may electrically insulate each of the first terminal plate 123 and the second terminal plate 133 from the cap plate 151. In an implementation, the upper insulation member 155 may be made of, e.g., PPS (polyphenylene sulfide), but the embodiments are not limited thereto.

The lower insulation member 160 may be between each of the first collector plate 121 and the second collector plate 131 and the cap plate 151. The lower insulation member 160 may prevent unnecessary and undesirable electric shorts from occurring between the collector plates 121, 131 and the cap plate 151. For example, the lower insulation member 160 may prevent an unnecessary and undesirable electric short between the first collector plate 121 and the cap plate 151 and an unnecessary and undesirable electric short between the second collector plate 131 and the cap plate 151. The lower insulation member 160 may be between each of the first current collecting terminal 122 and the second current collecting terminal 132 and the cap plate 151. Thus, the lower insulation member 160 may also prevent unnecessary and undesirable electric shorts from occurring between each of the first current collecting terminal 122 and the second current collecting terminal 132 and the cap plate 151. In an implementation, the lower insulation member 160 may be made of, e.g., PPS (polyphenylene sulfide), but the embodiments are not limited thereto.

Shock damping members 170 (for preventing the electrode assembly 110 from being deformed or damaged) may be connected to the lower insulation member 160. For example, the shock damping members 170 (positioned between the electrode assembly 110 and the cap plate 151) may be further connected to the lower insulation member 160. Generally, during a drop shock test of the secondary battery 100, the electrode assembly 110 may slightly move inside the case 140 to contact an edge of the lower insulation member 160 (made of a relatively solid material), thereby resulting in deformation or damage of the electrode assembly 110 and ultimately causing an unwanted short between the electrode assembly 110 and the cap plate 151. Further, the unwanted short may also be created between the electrode assembly 110 and each of the collector plates 121 and 131, or between the electrode assembly 110 and each of the current collecting terminals 122 and 132. However, according to an embodiment, the shock damping members 170 (capable of absorbing the shock applied from the electrode assembly 110) may be connected to the lower insulation member 160.

In an implementation, the shock damping members 170 may be made of a relatively soft material, compared to the lower insulation member 160. For example, the shock damping members 170 may have a R-scale Rockwell hardness smaller than that of the lower insulation member 160. In an implementation, the shock damping members 170 may be made of rubber, e.g., polyurethane rubber. The shock damping members 170 made of polyurethane rubber may have a R-scale Rockwell hardness of about 40 to about 50 and may be capable of efficiently absorbing and mitigating shock applied from the electrode assembly 110.

The polyurethane rubber may be freely formable and may a R-scale Rockwell hardness of about 30 to about 95. Further, the polyurethane rubber may have excellent elasticity, may be easily processed, and may not react with an electrolytic solution. Thus, polyurethane rubber may be appropriately used for the shock damping members 170. As noted above, the lower insulation member 160 may have a R-scale Rockwell hardness greater than that of the polyurethane rubber and may be made of a relatively solid material.

Figure 5:
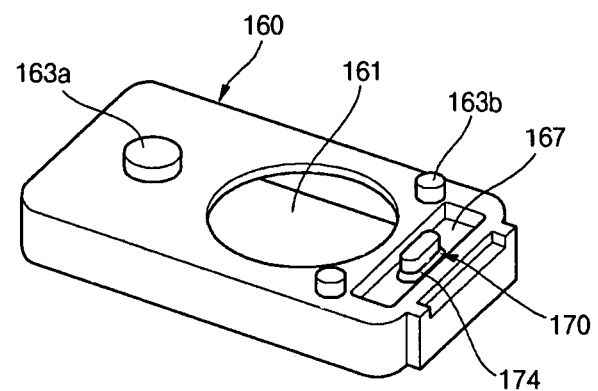
FIG. 5 illustrates an enlarged perspective view showing a connecting relationship between the lower insulation member and a shock damping members in the secondary battery of FIG. 1.
Figure 6A:
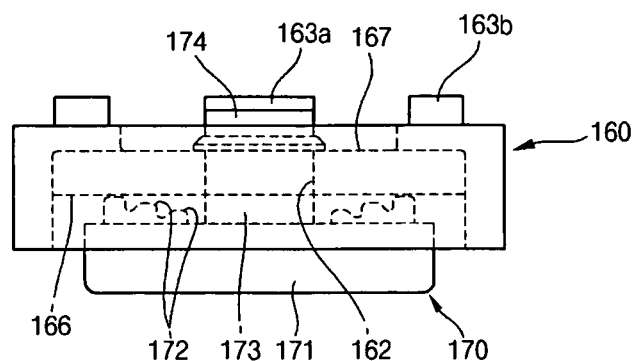
FIG. 6A illustrates a front view with interior phantom lines showing a connecting relationship between the lower insulation member and the shock damping members in the secondary battery of FIG. 1.
Figure 6B:
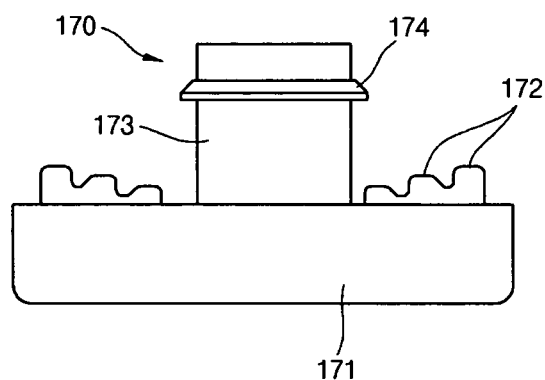
FIG. 6B illustrates a front view of the shock damping member of FIG. 6A.
Figure 7:
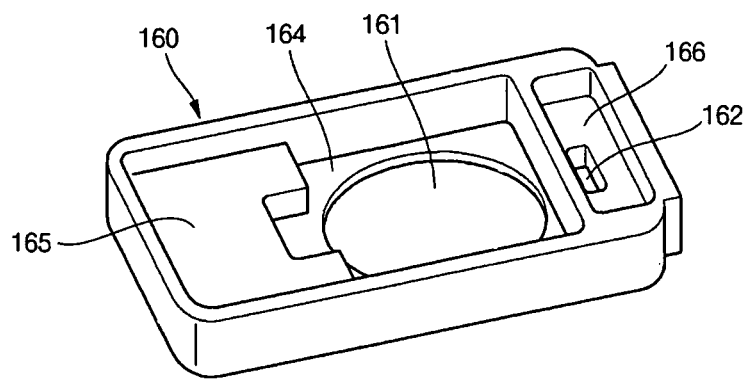
FIG. 7 illustrates a perspective view showing a bottom surface of the lower insulation member in the secondary battery of FIG. 1.

FIG. 5 illustrates an enlarged perspective view showing a connecting relationship between the lower insulation member and a shock damping members in the secondary battery of FIG. 1. FIG. 6A illustrates a front view with interior phantom lines showing a connecting relationship between the lower insulation member and the shock damping members in the secondary battery of FIG. 1. FIG. 6B illustrates a front view of the shock damping member of FIG. 6A. FIG. 7 illustrates a perspective view showing a bottom surface of the lower insulation member in the secondary battery according of FIG. 1.

As shown in FIGS. 5 through 7, the shock damping members 170 (positioned between the electrode assembly 110 and the cap plate 151) may be further connected to the lower insulation member 160. The lower insulation member 160 and the shock damping members 170 will now be described in greater detail.

The lower insulation member 160 may have a main throughhole 161 formed in a substantially vertical direction to facilitate extension of the current collecting terminal (either a first current collecting terminal or a second current collecting terminal) therethrough and to facilitate coupling thereto. In addition, a sub throughhole 162 may be formed at one side of the main throughhole 161 to facilitate extension of the shock damping members 170 therethrough and to facilitate coupling thereto. Further, a plurality of protrusions 163a and 163b may be formed on a top surface of the lower insulation member 160 and may be engaged with grooves (not shown) of the cap plate 151. Accordingly, it is possible to prevent the lower insulation member 160 (positioned under the cap plate 151) from rotating.

The lower insulation member 160 may have a first main lower mounting groove 164 on a bottom surface thereof (connected to the main throughhole 161) to facilitate placement of the flange (122a of FIG. 3) of the current collecting terminal 122 therein. In addition, the lower insulation member 160 may have a second main lower mounting groove 165 on a bottom surface thereof (connected to the first main lower mounting groove 164) to facilitate placement of the collector plate (121 of FIG. 3) therein.

In addition, the lower insulation member 160 may have a sub lower mounting groove 166 at one side of the first and second main lower mounting grooves 164 and 165 (connected to the sub throughhole 162) to facilitate placement of the shock damping members 170 therein. For example, the lower insulation member 160 may include the sub lower mounting groove 166 on the bottom surface thereof (connected to the sub throughhole 162). In addition, the lower insulation member 160 may have an upper mounting groove 167 on a top surface thereof (connected to the sub throughhole 162). In an implementation, the protrusions 163b may be between the main throughhole 161 and the sub throughhole 162. Each of the protrusions 163b may be spaced a predetermined distance apart from the protrusion 163a (formed at the other side of the main throughhole 161), thereby creating a substantially triangular imaginary line formed by the protrusions 163a and 163b.

As described above, the lower insulation member 160 may be positioned between the cap plate 151 and each of a collector plate and a current collecting terminal. Thus, when the current collecting terminal and the terminal plate are coupled to each other, coupling of the current collecting terminal and the terminal plate may be achieved with an increased force. Accordingly, the lower insulation member 160 (formed of PPS having a relatively high R-scale Rockwell hardness) may be capable of withstanding a high mechanical stress and preventing the lower insulation member 160 from reacting with an electrolytic solution. However, in a typical secondary battery, the lower insulation member may become excessively hardened, thereby causing deformation or damage to the electrode assembly due to contact with the electrode assembly when an internal shock is applied to the secondary battery.

Accordingly, in order to prevent the electrode assembly from being deformed or damaged, the shock damping members 170 (made of a relatively soft material and having a relatively small R-scale Rockwell hardness) may be provided at one side of the lower insulation member 160. The shock damping members 170 may be made of a material that does not react with an electrolytic solution.

The shock damping members 170 may be positioned in the sub throughhole 162, the sub lower mounting groove 166, and the upper mounting groove 167 in the lower insulation member 160. The shock damping members 170 will now be described.

Each of the shock damping members 170 may include a body 171, a plurality of protrusions 172, a coupling protrusion 173, and a hooking protrusion 174.

The body 171 may be coupled to the sub lower mounting groove 166 in the lower insulation member 160. The body 171 may have a substantially rectangular parallelepiped shape and may have a thickness slightly greater than a depth of the sub lower mounting groove 166. Thus, the body 171 may protrude downwardly by a predetermined length from the lower insulation member 160. In addition, a bottom surface of the body 171 may be rounded. Thus, the electrode assembly 100 may not be prone to shocks applied from the body 171.

The plurality of protrusions 172 may be formed on a top surface of the body 171. The plurality of protrusions 172 may be substantially symmetrical with each other in view of the coupling protrusion 173. In addition, at least one of the plurality of protrusions 172 may be closely engaged with the sub lower mounting groove 166 in the lower insulation member 160. Further, the plurality of protrusions 172 may have different heights and may be, e.g., continuously, connected to one another. The heights of the plurality of protrusions 172 may gradually increase away from the coupling protrusion 173. Alternatively, the heights of the plurality of protrusions 172 may gradually increase toward the coupling protrusion 173.

Accordingly, when the electrode assembly 110 makes contact with the shock damping members 170, the first thickest protrusion 172 may firstly come into contact with the sub lower mounting groove 166 to absorb and mitigate the shocks applied thereto. Next, when the electrode assembly 110 makes contact with the shock damping members 170 with a greater force, the second thickest protrusion 172 may come into close contact with the sub lower mounting groove 166 to absorb and mitigate shocks applied thereto. Thus, shocks applied from the electrode assembly 110 may be efficiently absorbed and mitigated by the plurality of protrusions 172. For example, the body 171 of each of the shock damping members 170 may absorb and mitigate shocks applied from the electrode assembly 110.

The coupling protrusion 173 may extend upwardly through the sub throughhole 162 in the lower insulation member 160. Vertical sections of the sub throughhole 162 and the coupling protrusion 173 may have substantially rectangular parallelepiped shapes. Thus, the shock damping members 170 may be prevented from being dislodged from the lower insulation member 160.

The hooking protrusion 174 may be formed around a top end of the coupling protrusion 173. In an implementation, the hooking protrusion 174 may have a width greater than that of the coupling protrusion 173. In addition, the width of the hooking protrusion 174 may gradually decrease toward upper portions thereof. Accordingly, once the shock damping members 170 are connected to the lower insulation member 160 in a bottom-to-top direction, the shock damping members 170 may not be dislodged from the lower insulation member 160. In addition, the hooking protrusion 174 may extend upwardly by a predetermined length. A top end of the hooking protrusion 174 may eventually be brought into close contact with the cap plate 151. However, in an implementation, the hooking protrusion 174 may have a height smaller than the plurality of protrusions 163a and 163b in the lower insulation member 160.

A R-scale Rockwell hardness of the shock damping members 170 may be smaller than that of the lower insulation member 160, as described above. The shock damping members 170 may be made of, e.g., rubber, polyurethane rubber, and/or equivalents thereof, and may have a R-scale Rockwell hardness of about 40 to about 50.

As described above, the secondary battery according to the embodiments may further include the shock damping members 170 having a smaller R-scale Rockwell hardness than the lower insulation member 160 (having a relatively large R-scale Rockwell hardness). Thus, the shock damping members 170 may prevent the electrode assembly 110 and the lower insulation member 160 from directly contacting each other during a drop shock test of the secondary battery. In addition, the shock damping members 170 may absorb and mitigate shocks applied from the electrode assembly 110. Therefore, the shock damping members 170 may prevent the electrode assembly 110 from deforming or being damaged, thereby preventing an electric short between the electrode assembly 110 and the cap plate 151.

Figure 8A:
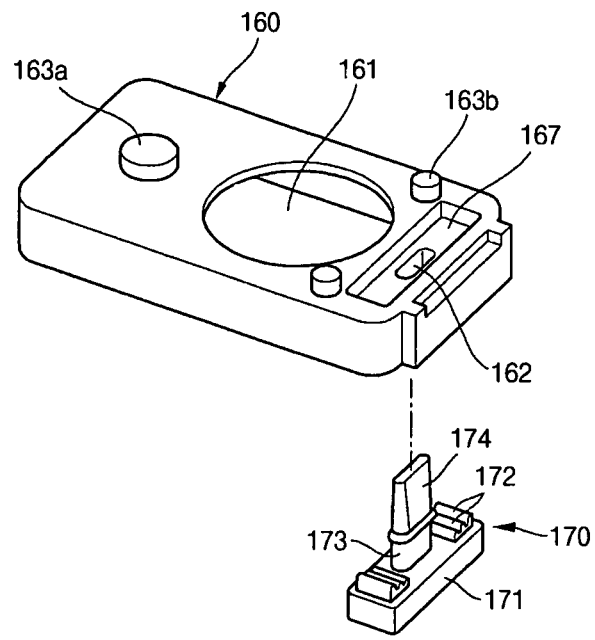
FIGS. 8A through 8C illustrate perspective views of stages in a method of connecting the lower insulation member to each of the shock damping members in the secondary battery of FIG. 1.
Figure 8B:
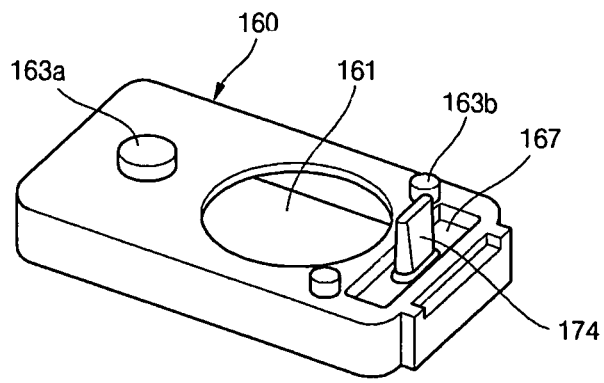
Figure 8C:
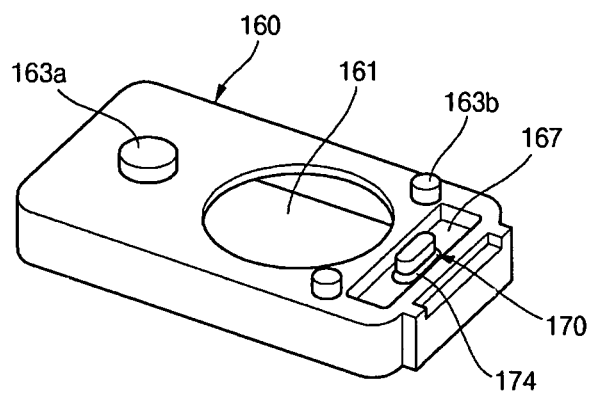

FIGS. 8A through 8C illustrate perspective views of stages in a method of connecting the lower insulation member to shock damping members in the secondary battery of FIG. 1.

As shown in FIG. 8A, the secondary battery may include shock damping members 170 and a lower insulation member 160. The lower insulation member may include a sub throughhole 162, a sub lower mounting groove 166, and an upper mounting groove 167. The shock damping members 170 may include a body 171, a plurality of protrusions 172, a coupling protrusion 173, and a hooking protrusion 174. The shock damping members 170 may have a R-scale Rockwell hardness smaller than that of the lower insulation member 160.

As shown in FIG. 8B, the hooking protrusion 174 of the shock damping member 170 may pass through the sub throughhole 162 of the lower insulation member 160. After the hooking protrusion 174 of the shock damping member 170 completely passes through the sub throughhole 162 of the lower insulation member 160, it may be safely seated in the upper mounting groove 167. Thus, it is possible to prevent the shock damping members 170 from being dislodged downwardly from the lower insulation member 160.

As shown in FIG. 8C, an upper portion of the hooking protrusion 174 of the shock damping member 170 (having passed through the lower insulation member 160) may be cut for removal. Thus, the hooking protrusion 174 protruding from the lower insulation member 160 may have a height smaller than the protrusions 163a and 163b formed in the lower insulation member 160.

The embodiments provide a secondary battery that prevents an electrode assembly from deforming or being damaged by mitigating shocks between a lower insulation member brought into close contact with a cap plate and the electrode assembly during a drop shock test of the secondary battery.

In the secondary battery according to an embodiment, shock damping members (each having a Rockwell hardness value smaller than that of an insulation member) may be included in the insulation member. Accordingly, the shock damping members may prevent the electrode assembly and the insulation member from directly contacting each other when a shock is applied to the secondary battery due to, e.g., a fall or drop, while absorbing and mitigating the shock applied from the electrode assembly. Thus, the shock damping members may prevent direct electric short or short-circuiting between the electrode assembly and the cap plate by preventing deformation or damages of the electrode assembly.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
an electrode assembly;
a case housing the electrode assembly;
a current collecting terminal electrically connected to the electrode assembly;
a cap plate capping the case to seal the electrode assembly, the case, and the current collecting terminal;

an insulation member interposed between the current collecting terminal and the cap plate;

an electrode terminal electrically connected to the current collecting terminal and extending through the insulation member and the cap plate; and shock damping members between the electrode assembly and the cap plate, the shock damping members being coupled with the insulation member, wherein each of the shock damping members includes:

a body closely contacting a bottom surface of the insulation member, and a coupling protrusion extending upwardly through the insulation member.

2. The secondary battery as claimed in claim 1, wherein the insulation member includes throughholes therethrough, the shock damping members extending through the throughholes.

3. The secondary battery as claimed in claim 2, wherein the insulation member further includes lower mounting grooves on a bottom surface thereof, the throughholes being connected with the lower mounting grooves and the lower mounting grooves being coupled with the shock damping members.

4. The secondary battery as claimed in claim 1, wherein the coupling protrusion includes a hooking protrusion on a top end thereof.

5. The secondary battery as claimed in claim 4, wherein the insulation member further includes an upper mounting groove on a top surface thereof, the hooking protrusion being seated on the upper mounting groove.

6. The secondary battery as claimed in claim 4, wherein the hooking protrusion is in close contact with the cap plate.

7. The secondary battery as claimed in claim 1, wherein:

each of the shock damping members has a plurality of protrusions on a surface of the body, and at least one of the plurality of protrusions closely contacts a bottom surface of the insulation member.

8. The secondary battery as claimed in claim 7, wherein the plurality of protrusions includes protrusions each of different heights from one another.

9. The secondary battery as claimed in claim 7, wherein the plurality of protrusions are connected to one another.

10. The secondary battery as claimed in claim 1, wherein the body of each of the shock damping members has a width greater than a width of the coupling protrusion.

11. The secondary battery as claimed in claim 1, wherein each of the shock damping members has a R-scale Rockwell hardness smaller than a R-scale Rockwell hardness of the insulation member.

12. The secondary battery as claimed in claim 1, wherein each of the shock damping members is made of rubber.

13. The secondary battery as claimed in claim 1, wherein each of the shock damping members is made of polyurethane rubber.

14. The secondary battery as claimed in claim 1, wherein the shock damping members have a R-scale Rockwell hardness of about 40 to about 50.

* * * * *